Mar. 27, 1923.

W. E. WILLIAMS.
POPPET VALVE HEAD.
FILED JULY 12, 1920.

1,449,876.

Witness:
B. J. Bernhard

Inventor:
W. E. Williams

Patented Mar. 27, 1923.

1,449,876

UNITED STATES PATENT OFFICE.

WILLIAM ERASTUS WILLIAMS, OF CHICAGO, ILLINOIS.

POPPET-VALVE HEAD.

Application filed July 12, 1920. Serial No. 395,678.

*To all whom it may concern:*

Be it known that I, WILLIAM ERASTUS WILLIAMS, a citizen of the United States, a resident of Chicago, in the county of Cook and State of Illinois, have invented a new and useful Improvement in Poppet-Valve Heads, of which the following is a specification.

My invention relates to valves that are generally used in internal combustion engines.

The object of my invention is to provide a valve head structure that will accommodate itself to the seat and make a more secure seal than has heretofore been accomplished with valve heads.

Reference will be had to the accompanying drawings in which Figure 1 is a section through a poppet valve more or less analogous in the form shown to what is used in automobile engines.

Figure 1:
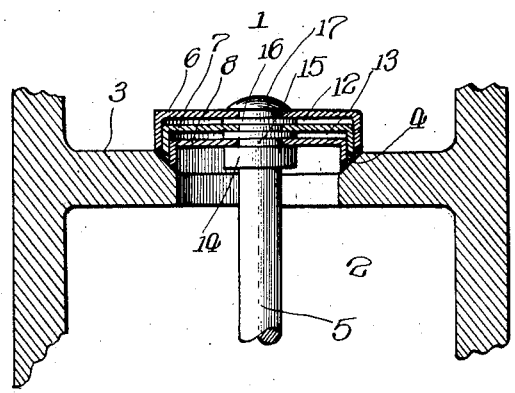
Figure 2:
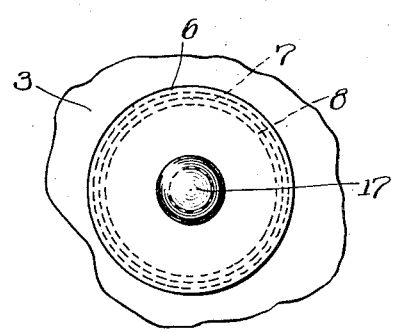
Figure 2 is a plan of the structure of Figure 1.
Figure 3:
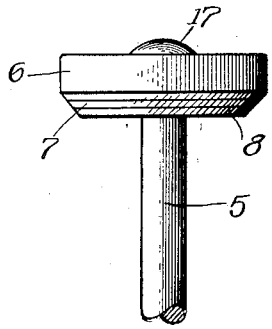
Figure 3 is a valve head in elevation.
Figure 4:
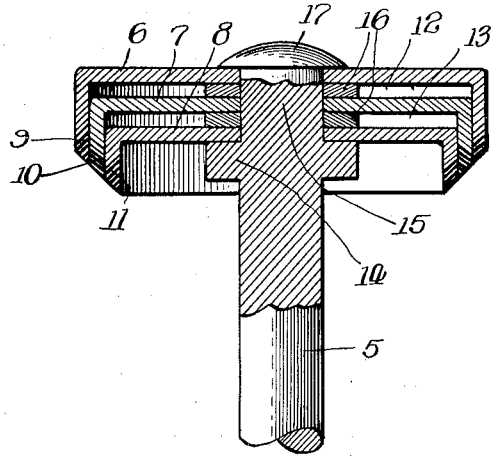
Figure 4 is an enlarged sectional view of the valve head.

In the drawing 1 indicates the combustion chamber and 2 the exhaust or intake manifold area as the case may be. 3 indicates the ordinary wall wherein the valve is placed and 4 indicates the ordinary valve seat in this wall 3. 5 indicates the ordinary valve stem on which is fastened my head which is made of the cup-shaped thin disks 6—7 and 8. These disks are made out of thin material and may be provided when required with an alloy metal on the front or valve surfaces only as indicated by the shaded portions 9, 10 and 11 shown only in Figure 4.

I may make the main body of these several valve sections out of a low grade cheap metal and faced with an alloy peculiarly adapted to resist heat such as tungsten or an alloy of that sort which is high priced and of which only a little is required as a facing feature. The several disks 6, 7 and 8, are separated from each other by air insulation spaces 12 and 13 so that the intense heat which may come upon the outer disk 6 may be transmitted slowly to the lower disks.

The several disks are held together through the medium of the shoulder 14 on the stem 5 and the packing washers 16 placed in the spaces 12 and 13 and the head of the valve stem is riveted over as indicated by 17.

In the use of the valve as indicated there will be a little movement or springing action in the body of the several valve disks as the valve is seated and unseated and this will tend to dislodge any carbon under the valve seat and will also serve to cause the parts to wear together and make a tighter seal than otherwise might be the case.

Intense heat, especially with large valves, may warp the outer member 6 rendering its seating imperfect, but the protected members 7, 8, whatever the size of the valve, practically seat perfectly.

This construction permits valves to be used in single units as large as may be desired and avoids the necessity of valve duplicates which have commonly been used when large areas are desired to be closed in internal combustion engines.

Methods of facing metal with a different metal or alloy are well known and not a part of this invention, but it may be here noted that as suggested in the drawings, the facing may be integral with the body. Such union is secured in many cases by fusing the facing metal and the body metal at their meeting faces.

What I claim is:—

1. A valve head having a stem and mounted thereon a series of approximately parallel, concentric, cup-like disks with their marginal faces formed to fit, individually and collectively, a conical valve seat combined with central means for keeping the disks spaced apart to allow the non-central portions to bend freely and independently regardless of bending of other disks.

2. In a valve, the combination with a stem, of a series of parallel flexible metal disks mounted on the stem, and central means for keeping the disks spaced apart, the disks being bent marginally to form laterally projecting sleeves movably telescoping with each other and all finished terminally to fit a suitable valve seat.

3. In a valve, the combination with a stem, of a plurality of parallel, flexible metal disks mounted on the stem and provided with marginal sleeve-like lateral flanges adjustably telescoping with each other and each having its terminal face protected by integral metal differing in character from that of the body of the disk, and central means for holding the disks spaced from each other.

4. The combination with a valve stem, of a series of parallel flexible metal disks carried by the stem and means for spacing the disks apart, the successive disks being bent marginally to form annular flanges all having terminal seating faces to fit a single seat and all movably fitting, sleevelike, over each other, to form a valve having internal heat-insulating spaces formed by the disks and concentric independently adjustable flanges.

5. The combination with a plurality of parallel flexible metal disks having their centers in the same line, of means for maintaining an air space between successive disks, and a valve stem centrally connected to and carrying the disks, each of said disks having its marginal portion bent to form a lateral annular flange adjustably telescoping with the similar flange of an adjacent disk; whereby the terminal faces of the flanges separately adjust themselves to a valve seat and each flange protects from heat the flanges nearer the stem.

Signed at Chicago, in the county of Cook and State of Illinois, this 3rd day of July, 1920.

WILLIAM ERASTUS WILLIAMS.

Witnesses:
 F. ZOHEL,
 B. J. BERNHARD.